United States Patent
Soroka et al.

(10) Patent No.: US 7,971,883 B2
(45) Date of Patent: Jul. 5, 2011

(54) WORKHOLDING CLAMPING ASSEMBLY

(75) Inventors: Daniel P Soroka, Horseheads, NY (US); Richard Kesterke, III, Lawrenceville, PA (US)

(73) Assignee: Hardinge, Inc., Elmira, NY (US)

( * ) Notice: Subject to any disclaimer, the term of this patent is extended or adjusted under 35 U.S.C. 154(b) by 1306 days.

(21) Appl. No.: 11/516,727

(22) Filed: Sep. 7, 2006

(65) Prior Publication Data
US 2007/0063406 A1   Mar. 22, 2007

(51) Int. Cl.
*B23B 31/20* (2006.01)
(52) U.S. Cl. ............... 279/2.04; 279/2.09; 279/4.08; 279/43.4; 279/53; 279/155
(58) Field of Classification Search ............... 279/2.01, 279/2.02, 2.04, 2.06, 2.09, 4.08, 43.2, 43.4, 279/46.3, 51, 53, 155; 74/110; 409/233; *B23B 31/20*
See application file for complete search history.

(56) References Cited

U.S. PATENT DOCUMENTS

| | | | |
|---|---|---|---|
| 2,359,507 A * | 10/1944 | Bell | 279/53 |
| 2,383,094 A | 8/1945 | Walder | |
| 2,708,117 A | 5/1955 | Flory | |
| 2,889,150 A | 6/1959 | Goldring et al. | |
| 3,025,646 A * | 3/1962 | Thompson | 451/5 |
| 3,077,353 A * | 2/1963 | Parsons | 279/51 |
| 3,087,736 A | 4/1963 | Lukas | |
| 3,385,607 A | 5/1968 | Hughes | |
| 3,427,035 A | 2/1969 | Heldt | |
| 3,434,730 A | 3/1969 | Smrekar | |
| 3,498,618 A * | 3/1970 | Hultgren | 279/4.04 |
| 3,533,636 A * | 10/1970 | Firestone et al. | 279/4.07 |
| 3,542,385 A | 11/1970 | Seittler | |
| 3,594,013 A * | 7/1971 | Lauffer | 279/4.09 |
| 3,599,998 A | 8/1971 | Kiwalle et al. | |
| 3,615,100 A | 10/1971 | Banner et al. | |
| 3,687,468 A | 8/1972 | Skahen | |
| 3,779,566 A | 12/1973 | Tarbox et al. | |
| 3,799,561 A | 3/1974 | Humbert | |

(Continued)

FOREIGN PATENT DOCUMENTS

JP          04041108 A  *  2/1992

(Continued)

OTHER PUBLICATIONS

Hardinge Sure-Grip® Power Chuck Safety and Technical Manual B-87Z, pp. 30-31, 1998.

*Primary Examiner* — Eric A Gates
(74) *Attorney, Agent, or Firm* — Pillsbury Winthrop Shaw Pittman LLP

(57) ABSTRACT

A failsafe workholding clamping assembly includes a base, an axially slidable draw bar and collet, and a force amplifier. A driver applies a continuous driving force to the force amplifier. The force amplifier amplifies the driving force and applies a resulting amplified force to the draw bar to bias the draw bar toward its closed position and the collet toward its gripping position. A collet opener mounts to the base and selectively applies an opening force to the draw bar to counteract the driving force and move the collet into its released position. The workholding clamping assembly holds a collet in a predetermined rotational orientation and includes a draw bar rotating mechanism to enable an operator to rotate the draw bar to threadingly engage the draw bar and a rotationally-fixed collet.

30 Claims, 7 Drawing Sheets

U.S. PATENT DOCUMENTS

| | | | |
|---|---|---|---|
| 3,841,645 A | 10/1974 | Parsons | |
| 3,875,848 A * | 4/1975 | Powell | 409/233 |
| 3,880,046 A | 4/1975 | Sessody | |
| 3,911,624 A | 10/1975 | Happy | |
| 3,921,993 A | 11/1975 | Ingham et al. | |
| 3,992,019 A * | 11/1976 | Crawshay | 279/4.12 |
| 4,046,390 A | 9/1977 | Dunham | |
| 4,068,559 A * | 1/1978 | Schmid et al. | 409/233 |
| 4,103,589 A | 8/1978 | Francis | |
| 4,121,847 A | 10/1978 | Morawski | |
| 4,171,820 A | 10/1979 | Klancnik | |
| 4,347,753 A * | 9/1982 | Claussen et al. | 74/110 |
| 4,393,945 A | 7/1983 | Rassieur | |
| 4,791,841 A | 12/1988 | Pruvot et al. | |
| 4,915,553 A * | 4/1990 | Lazarevic | 409/233 |
| 4,943,071 A | 7/1990 | Srebot et al. | |
| 4,971,339 A | 11/1990 | Treff | |
| 5,022,278 A * | 6/1991 | DeCaussin | 74/110 |
| 5,108,236 A | 4/1992 | Arai et al. | |
| 5,149,111 A | 9/1992 | Han | |
| 5,249,815 A | 10/1993 | Beere | |
| 5,269,543 A * | 12/1993 | Nowak et al. | 279/146 |
| 5,330,224 A | 7/1994 | Terwilliger et al. | |
| 5,490,683 A | 2/1996 | Mickel et al. | |
| 5,549,308 A | 8/1996 | Bennett | |
| 5,613,692 A | 3/1997 | Lloyd | |
| 5,626,448 A * | 5/1997 | Huang et al. | 409/233 |
| 5,662,442 A * | 9/1997 | Taki et al. | 409/233 |
| 5,762,345 A * | 6/1998 | Nowak et al. | 279/146 |
| 5,806,859 A | 9/1998 | Saccomanno, III | |
| 5,909,882 A | 6/1999 | Schill | |
| 5,980,172 A | 11/1999 | Shoda | |
| 6,260,855 B1 | 7/2001 | Curtis | |
| 6,270,086 B1 * | 8/2001 | Lloyd | 279/51 |
| 6,270,087 B1 | 8/2001 | Mickel et al. | |
| RE37,397 E | 10/2001 | Lloyd | |
| 6,497,417 B2 | 12/2002 | Wu | |
| 2002/0053771 A1 | 5/2002 | Wu | |
| 2003/0080520 A1 | 5/2003 | Stephens | |
| 2005/0087046 A1 | 4/2005 | Smith | |
| 2009/0322042 A1 * | 12/2009 | Kitamura | 279/49 |

FOREIGN PATENT DOCUMENTS

| | | |
|---|---|---|
| JP | 2002-46005 | 12/2002 |

* cited by examiner

WORKHOLDING CLAMPING ASSEMBLY

CROSS REFERENCE

This application claims priority to U.S. Provisional Patent Application Ser. No. 60/714,268, titled "Workholding Clamping Assembly," filed Sep. 7, 2005, the entire contents of which are hereby incorporated by reference.

BACKGROUND OF THE INVENTION

1. Field of the Invention

The present invention relates to failsafe workholding clamping assemblies for holding work pieces.

2. Description of Related Art

As shown in JP2002046005, it is known to provide a failsafe workholding clamping assembly that maintains a collet in a closed position unless an opening force is applied. Failsafe workholding clamping assemblies are advantageous because they will not accidentally release a work piece, even if power to the closing mechanism is lost (e.g., loss of drawbar force, pneumatic force, hydraulic force, etc.).

Conventional failsafe workholding clamping assemblies include drivers (e.g., compression springs) that close the collets in the absence of a counteracting opening force. Large drivers are required to provide the large closing forces necessary to keep collets closed. Unfortunately, such large drivers make conventional workholding clamping assemblies large, axially long, and radially wide.

BRIEF SUMMARY OF THE INVENTION

One aspect of one or more embodiments of this invention provides an axially and radially compact failsafe workholding clamping assembly.

Another aspect of one or more embodiments of this invention provides a failsafe collet assembly that utilizes a smaller driver than conventional failsafe collet assemblies.

Another aspect of one or more embodiments of this invention provides a compact pneumatic failsafe workholding clamping assembly.

Another aspect of one or more embodiments of this invention provides a compact workholding clamping assembly that enables an orientation-specific mounting of a collet thereto.

Another aspect of one or more embodiments of this invention provides a failsafe workholding clamping assembly that amplifies a closing force provided by a driver in order to reduce the force that the driver must generate to close the collet. The force amplifier may also reduce a force required to overcome the closing force of the driver to open the collet.

Another aspect of one or more embodiments of this invention provides a failsafe workholding clamping assembly that includes a base, a draw bar operatively connected to the base for movement along an axis relative to the base between open and closed positions, a structure operatively connected to the base for movement along the axis relative to the base between open and closed positions, a driver that operatively extends between the base and the structure and applies a continuous driving force to the structure that tends to bias the structure toward its closed position, and a force amplifier operatively extending between the structure and the draw bar. The force amplifier amplifies the driving force and applies a resulting amplified force to the draw bar to bias the draw bar toward its closed position. The assembly also includes a collet opener supported by the base and constructed and arranged to apply a force to the structure that counteracts the driving force with an opening force, thereby preventing the driver from biasing the draw bar toward the closed position. The structure and draw bar are arranged such that the structure cannot move into its open position unless the draw bar is disposed in its open position.

According to a further aspect of one or more of these embodiments, the structure and the draw bar are positioned and arranged such that if the draw bar does not move into its open position when the structure moves into its open position, the structure contacts the draw bar and forces the draw bar into its open position.

According to a further aspect of one or more of these embodiments, the force amplifier includes a first surface that moves with the draw bar relative to the base along the axis, a second surface that moves with the base relative to the draw bar, a third surface that moves with the structure and forms a non-zero angle with the axis, and at least one circular roller disposed between and contacting the first, second, and third surfaces. The first, second, and third surfaces may be frustaconical surfaces, and the at least one circular roller may include a plurality of spherical rollers.

According to a further aspect of one or more of these embodiments, the collet opener includes a piston/cylinder operatively extending between the base and the structure, and the selective application of pressurized fluid to the piston/cylinder creates the opening force.

Another aspect of one or more embodiments of this invention provides a method of opening a failsafe workholding clamping assembly. The assembly includes a base, a draw bar operatively connected to the base for movement along an axis relative to the base between open and closed positions, a structure operatively connected to the base for movement along the axis relative to the base between open and closed positions, a driver that applies a continuous driving force to the structure that tends to bias the structure toward its closed position, and a force amplifier that amplifies the driving force and applies a resulting amplified force to the draw bar to bias the draw bar toward its closed position. The method includes forcing the structure into its open position against the driving force of the driver, whereby movement of the structure into its open position forces the draw bar into the draw bar's open position.

Another aspect of one or more embodiments of this invention provides a failsafe workholding clamping assembly that includes a base, a draw bar operatively connected to the base for movement along an axis relative to the base between open and closed positions, a structure operatively connected to the base for movement along the axis relative to the base between open and closed positions, a driver that operatively extends between the base and the structure and applies a continuous driving force to the structure that tends to bias the structure toward its closed position, and a force amplifier operatively extending between the structure and the draw bar. The force amplifier amplifies the driving force and applies a resulting amplified force to the draw bar to bias the draw bar toward its closed position. The force amplifier includes a first surface that moves with the draw bar relative to the base along the axis, the first surface forming an acute angle $\beta$ with the axis. The force amplifier also includes a second surface that moves with the base relative to the draw bar, the second surface forming an acute angle $\alpha$ with the axis. The force amplifier also includes a third surface that moves with the structure and forms an acute, non-zero angle $\gamma$ with the axis. The force amplifier also includes at least one circular roller disposed between and contacting the first, second, and third surfaces. The assembly also includes a collet opener supported by the base and constructed and arranged to apply a force to the structure that counteracts the driving force with an opening force, thereby preventing the driver from biasing the draw bar toward the closed position.

According to a further aspect of one or more of these embodiments, the angles α and β are each less than 85 degrees. The angles α and β may be about equal to each other.

Another aspect of one or more embodiments of this invention provides a workholding clamping assembly that includes a base and a draw bar operatively connected to the base for movement along an axis relative to the base between open and closed positions. The draw bar is rotatable relative to the base about the axis. The draw bar includes a threaded portion that is constructed and arranged to threadingly engage a collet. The assembly also includes a driven gear operatively connected to the draw bar for rotation with the draw bar relative to the base, and a driving gear mounted to the base for rotation relative to the base. The driving gear meshes with the driven gear and is selectively rotatable.

According to a further aspect of one or more of these embodiments, the base includes a spindle having a bore therein that is concentric with the axis. The workholding clamping assembly further includes a collet disposed in the bore. The collet has gripping and released positions. The collet and spindle include mating surfaces that form a non-zero angle with the axis. The collet has a threaded portion that threadingly engages the threaded portion of the draw bar. Axial movement of the draw bar toward its closed position moves the collet toward its gripping position. The collet and spindle include mating surface features that permit the collet to extend into the bore in the spindle in a predetermined rotational position. The mating surface features prevent the collet from rotating relative to the spindle.

Another aspect of one or more embodiments of this invention provides a method of attaching a collet to a workholding clamping assembly that includes a base and a draw bar operatively connected to the base for movement along an axis relative to the base between open and closed positions. The method includes engaging a surface feature of the collet with a surface feature of the base, the surface features permitting the collet to move along the axis relative to the base while preventing the collet from rotating about the axis relative to the base. The method also includes rotating the draw bar relative to the base to threadingly engage a threaded portion of the draw bar with a threaded portion of the collet. Rotating the draw bar relative to the base may include rotating a driving gear that meshes with a driven gear, the driven gear being operatively connected to the draw bar for rotation with the draw bar relative to the base about the axis.

Additional and/or alternative advantages and salient features of the invention will become apparent from the following detailed description and/or claims, which, taken in conjunction with the annexed drawings, disclose preferred embodiments of the invention.

BRIEF DESCRIPTION OF THE DRAWINGS

Referring now to the drawings which from a part of this original disclosure.

DETAILED DESCRIPTION OF EMBODIMENTS OF THE INVENTION

Figure 1:
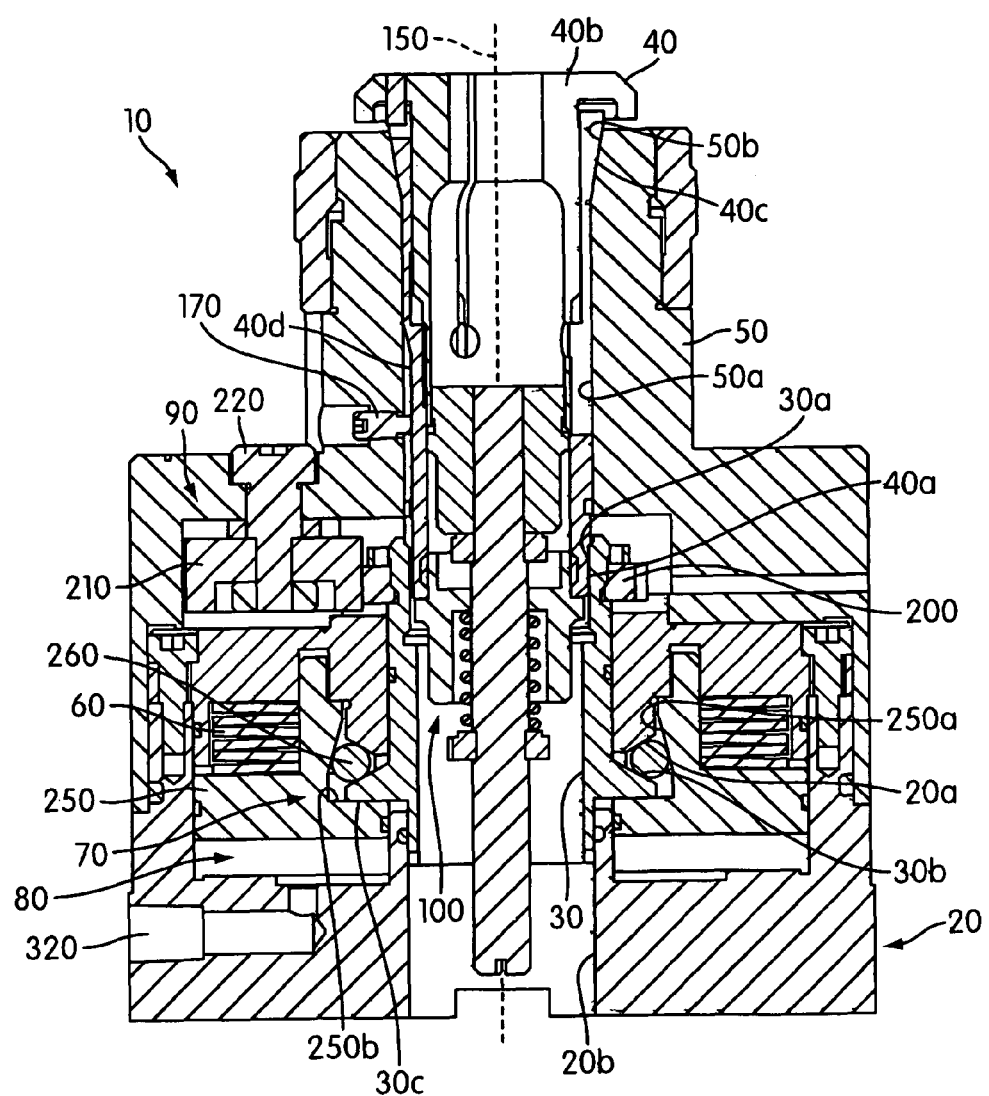
FIG. 1 is a cross-sectional view of a workholding clamping assembly according to an embodiment of the present invention in an open position.
Figure 2:
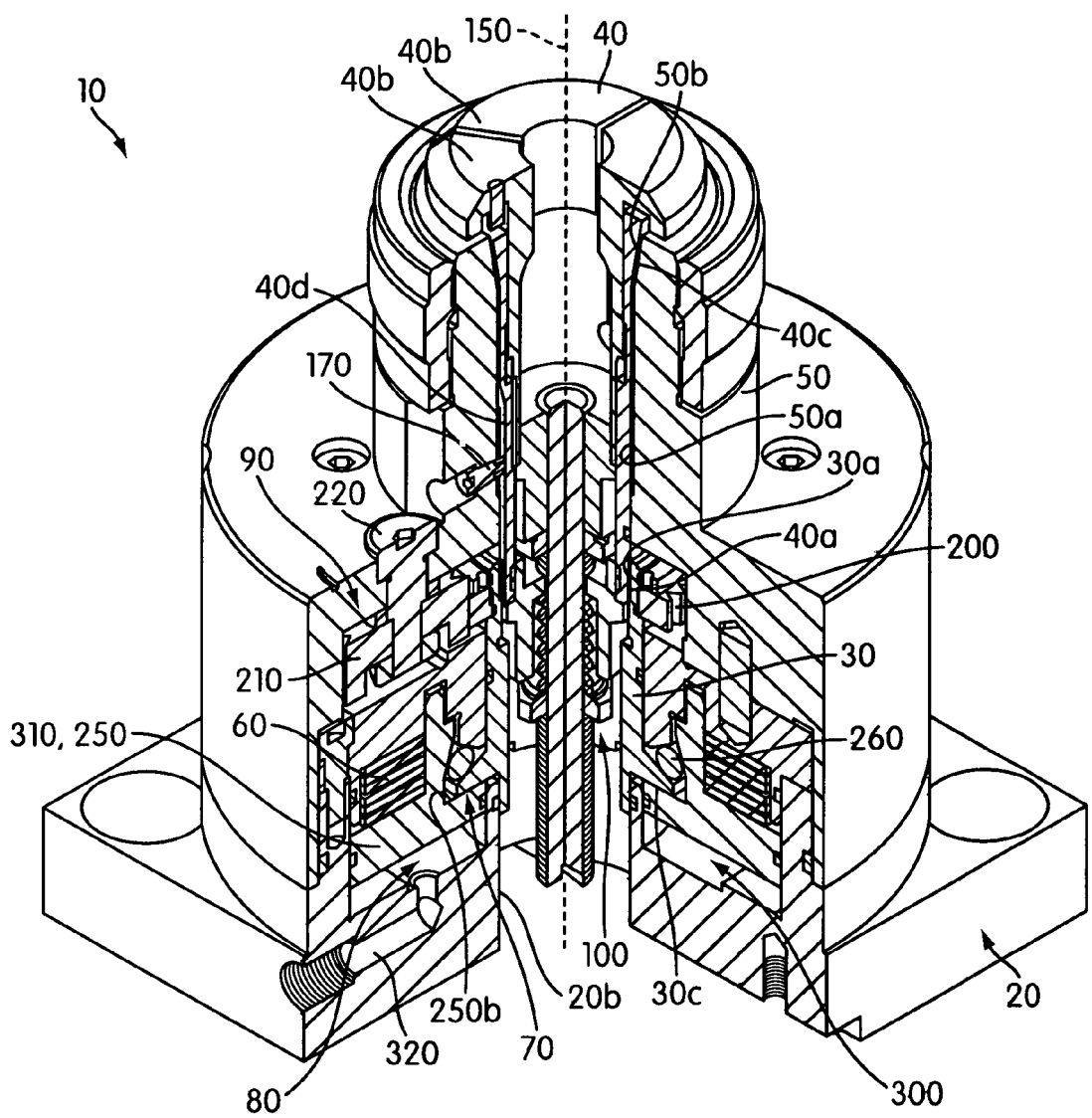
FIG. 2 is a partially cut away perspective view of the workholding clamping assembly in FIG. 1.
Figure 3:
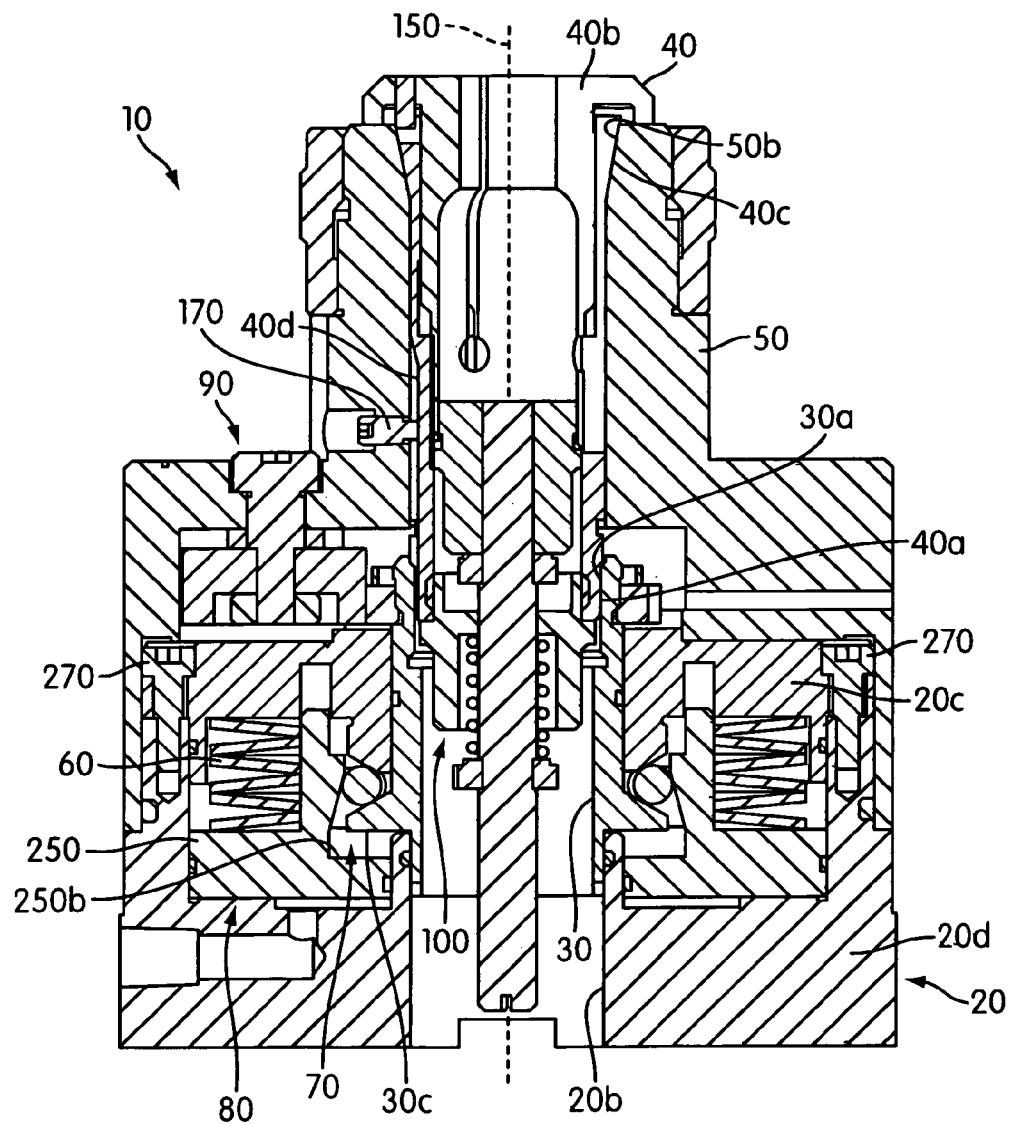
FIG. 3 is a cross sectional view of the workholding clamping assembly in FIG. 1 in a closed position.
Figure 4:
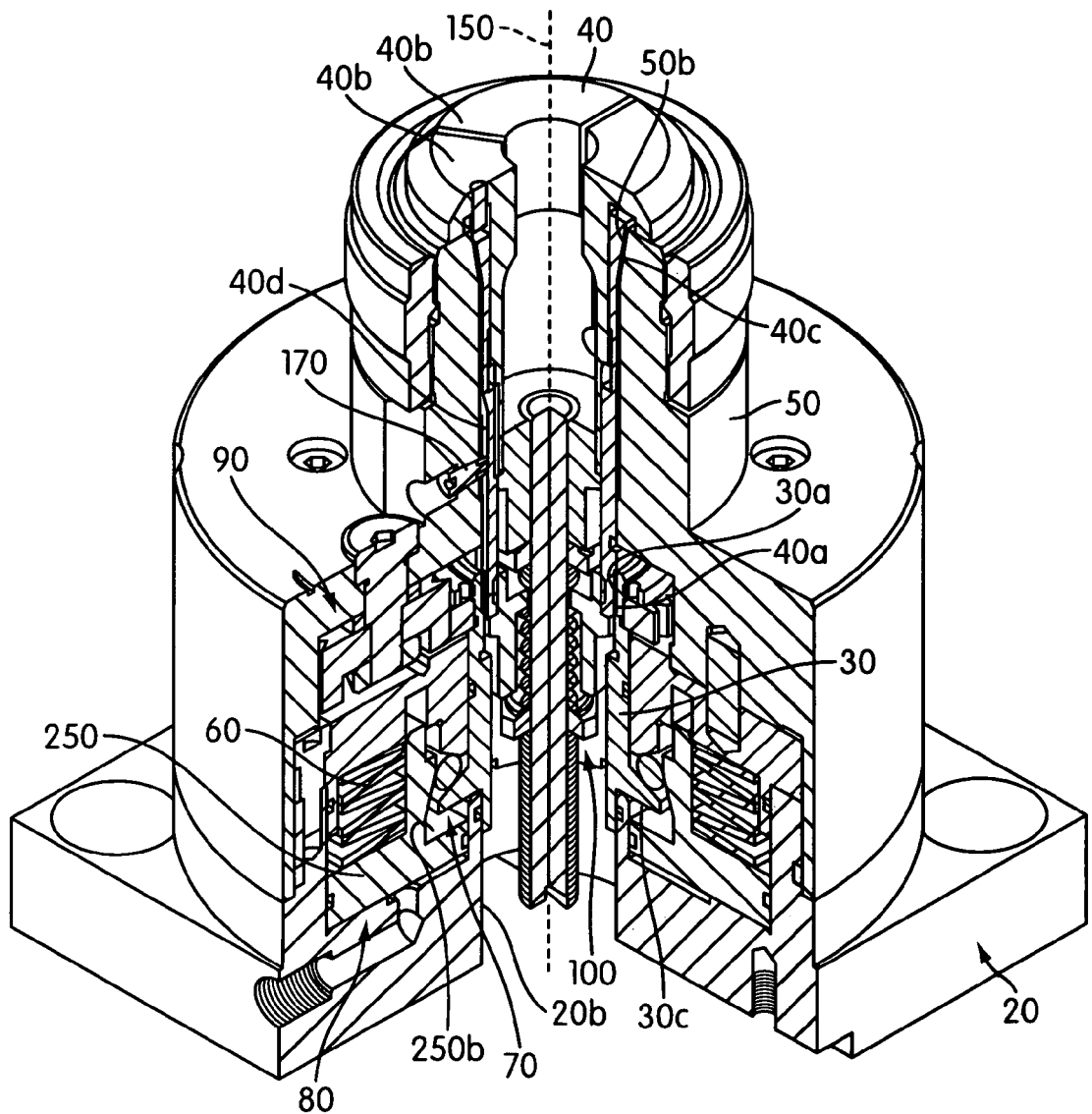
FIG. 4 is a partially cut away perspective view of the workholding clamping assembly in FIG. 3.

FIGS. 1-4 illustrate a failsafe workholding clamping assembly 10 for holding a work piece (e.g., a tool, a blank, etc.) according to an embodiment of the present invention. FIGS. 1 and 2 illustrate the workholding clamping assembly 10 in an open/released position, while FIGS. 3 and 4 illustrate the workholding clamping assembly 10 in a closed/gripping position.

As shown in FIG. 1, the workholding clamping assembly 10 comprises a base 20, a draw bar 30, a collet 40, a spindle 50, a driver 60, a force amplifier 70, a collet opener 80, a draw bar rotating mechanism 90, and a work piece ejector 100. However, one or more of these components may be omitted without deviating from the scope of the present invention.

As shown in FIG. 2, the base 20 of the workholding clamping assembly 10 includes a forward cylindrical portion and a rearward square mounting portion with mounting holes. However, the base 20 could have any other suitable shape without deviating from the scope of the present invention (e.g., entirely cylindrical, triangular, entirely square, etc.). Moreover, the base 20 may be integrated into a machine (e.g. the spindle of a lathe) without deviating from the scope of the present invention.

The draw bar 30 operatively connects to the base 20 for movement along an axis 150 relative to the base 20 between an open position (FIGS. 1, 2) and a closed position (FIGS. 3, 4). The draw bar 30 includes an internally threaded portion 30a that threadingly engages an externally threaded portion 40a of the collet 40. Alternatively, the draw bar 30 may be externally threaded and the collet 40 may be internally threaded. Moreover, any other suitable connection mechanism may be used to axially fasten the collet 40 to the draw bar 30 (e.g., a bolt extending through a hole in the collet 40 and threadingly engaging the draw bar 30, integral formation of the collet 40 and draw bar 30).

In the illustrated embodiment, the draw bar 30 comprises a hollow draw tube. However, the draw bar 30 may alternatively comprise any other suitable structure without deviating from the scope of the present invention (e.g., a hollow or solid rectilinear structure, a solid cylindrical structure, etc.).

Figure 6:
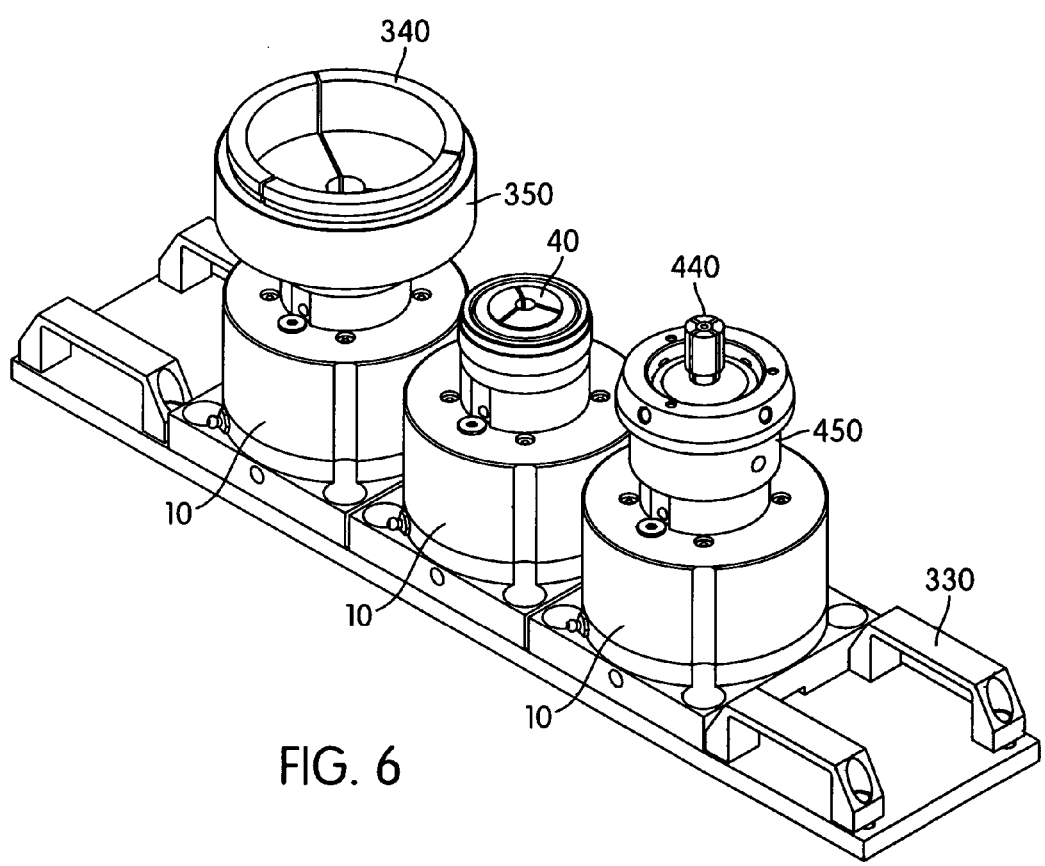
FIG. 6 is a perspective view of a plurality of workholding clamping assemblies mounted to a pallet according to an embodiment of the present invention.

The collet 40 includes a plurality of radially movable gripping segments 40b. In the illustrated embodiment, the gripping segments 40b are integrally formed with the collet 40 and separated from each other by slots formed in the collet 40. The collet 40 may alternatively comprise a plurality of discrete segments as is known in the art. As shown in FIG. 6, the collet 40 may be replaced by a step chuck collet 340 and step chuck closer/spindle 350 without deviating from the scope of the present invention. The collet 40 may also include an internal stop for controlling the depth to which a work piece can extend into the collet 40, which thereby controls the length of work piece stick-out.

The spindle 50 mounts to the base 20 in any suitable manner (e.g., pins, bolts, integral formation, etc.). The spindle 50 includes a bore 50a extending therethrough. The bore 50a is concentric with the axis 150. The collet 40 extends into the bore. The collet segments 40 and spindle 50 each include mating cam surfaces 40c, 50b. The cam surfaces define a non-zero angle with the axis 150. In the illustrated embodiment, the angle between the cam surfaces 40c, 50b and the axis 150 is about 10 degrees. In the illustrated embodiment, the cam surfaces 40c, 50b are generally frusta-conical.

Axial movement of the collet 40 relative to the spindle 50 causes the segments 40b to move radially such that the collet 40 moves between a gripping position (FIGS. 3, 4), in which the collet 40 is constructed and arranged to grip a work piece, and a released position (FIGS. 1, 2), in which the collet 40 is constructed and arranged to release the work piece. The collet segments 40b preferably are resiliently biased toward a released position (radially outwardly in the illustrated embodiment) so that the segments naturally move into their released positions when the collet 40 is not urged into its gripping position.

In the illustrated embodiment, the workholding clamping assembly 10 is designed to grip an outside diameter of a work piece. Alternatively, the workholding clamping assembly 10 can be designed to grip an inside diameter of a work piece. For example, as shown in FIG. 6, an inside diameter collet 440 and associated collet closer 450 may be used with the assembly 10. In the embodiment illustrated in FIG. 6, the collet 440 and closer 450 are adapted to be mounted to the draw bar 30 and spindle 50, respectively.

In the illustrated embodiment, the workholding clamping assembly 10 utilizes a pull-in-to-close configuration, but may alternatively be designed to utilize a push-out-to-close configuration without deviating from the scope of the present invention.

Hereinafter, the opening and closing of the workholding clamping assembly 10 is described.

The driver 60 constantly biases the draw bar 30 toward its closed position (FIGS. 3, 4) via the force amplifier 70. In the illustrated embodiment, the driver 60 comprises a series of Belleville springs, but may alternatively comprise any other suitable force-generating driver (e.g., opposed magnet(s), a compressed gas spring(s), helical spring(s), a resiliently deformable material such as rubber, etc.) without deviating from the scope of the present invention. In the illustrated embodiment, the Belleville springs 60 are concentric with the axis 150. Alternatively, the driver may comprise a plurality of smaller, circumferentially-spaced springs or other drivers.

Hereinafter, the force amplifier 70 is described with reference to FIG. 1. The driver 60 operatively extends between the base 20 and a structure 250. The structure 250 connects to the base 20 for movement relative to the base 20 along the axis 150 between an open position (FIGS. 1, 2) and a closed position (FIGS. 3, 4). The draw bar 30 includes a cam surface 30b. The base 20 includes a cam surface 20a. The structure 250 includes a cam surface 250a that forms a non-zero angle with the axis 150. A plurality of circular rollers 260 are disposed between the cam surfaces 20a, 30b, 250a. In the illustrated embodiment, the cam surfaces 20a, 30b, 250a are frusta-conical and the rollers 260 comprise spherical balls. Alternatively, the cam surfaces 20a, 30b, 250a could comprise a plurality of flat surfaces and the rollers 260 could comprise cylindrical rollers (or triangular wedges that have low-friction surfaces that parallel and slide against the cam surfaces 20a, 30b, 250a).

Figure 7:
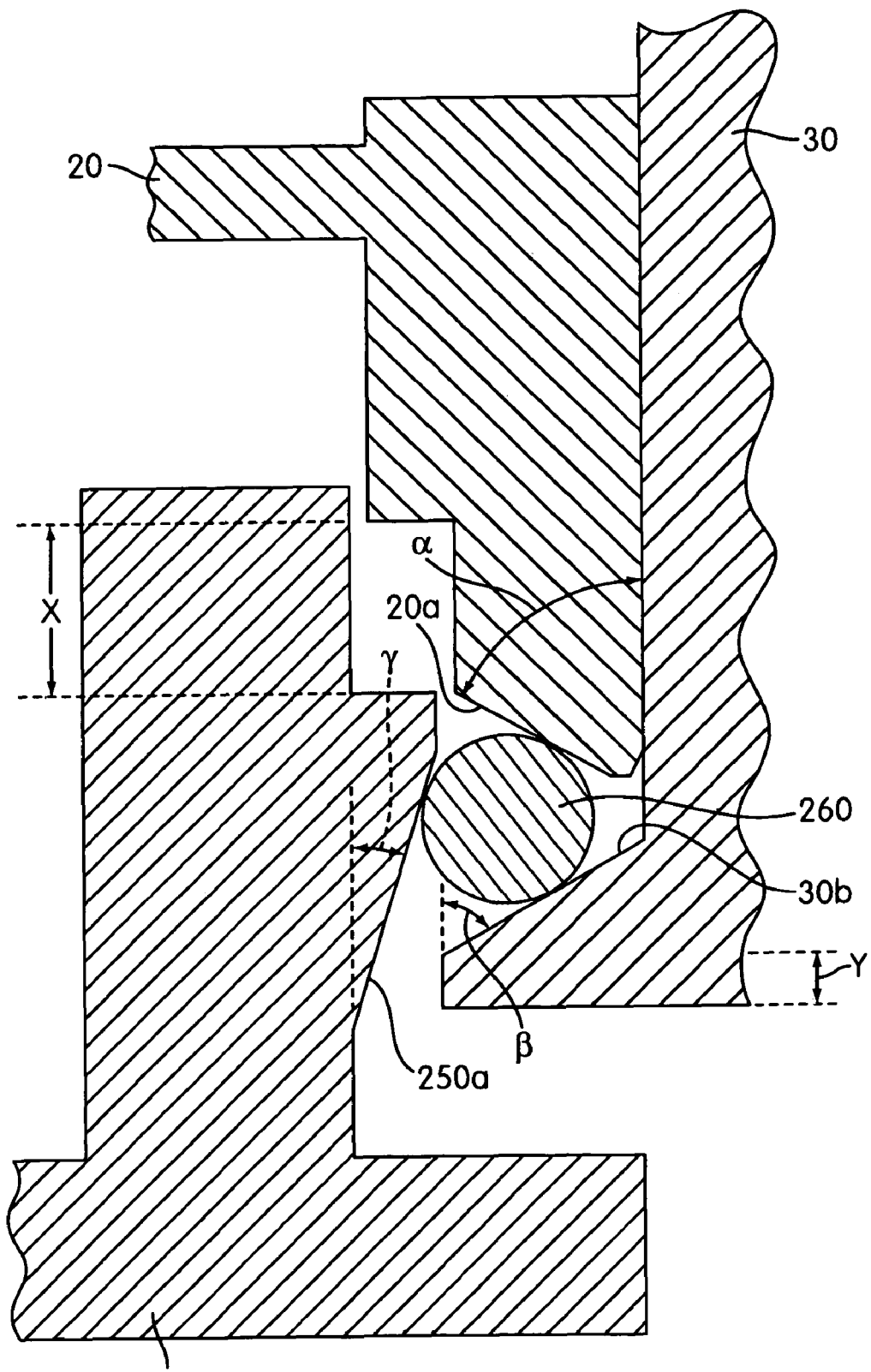
FIG. 7 is a partial cross-sectional view of the workholding clamping assembly in FIG. 1.

As shown in FIGS. 1 and 7, the cam surfaces 20a, 30b, 250a are angled relative to each other such that when the structure 250 moves toward its closed position by an axial distance X, the structure 250 displaces the rollers 260 radially inwardly, which causes the draw bar 30 to move an axial distance Y toward its closed position. The relative angles of the cam surfaces 20a, 30b, 250a may be designed such that a ratio X:Y is greater than 1. The ratio X:Y may be greater than 2, may be greater than 3, and may be greater than 4 or more. In the illustrated embodiment, the ratio X:Y is about 3.5:1. The reduction in travel distance of the draw bar 30 relative to the structure 250 causes an inverse increase in force that is transferred through the structure 250 to the draw bar 30. The driver 60 operatively extends between the base 20 and the structure 250 and applies a continuous driving force to the structure 250. The force amplifier 70 amplifies the driving force by a factor of X:Y to apply a resulting amplified closing force to the draw bar 30 to urge the draw bar 30 toward its closed position (shown in FIGS. 3, 4), and, in turn, urge the collet 40 into its gripping position. Consequently, the force amplifier 70 reduces the driving force that the driver 60 must generate to securely hold a work piece in the collet 40.

In the illustrated embodiment, as shown in FIG. 7, each of the cam surfaces 20a, 30b, 250a form non-right angles α, β, γ, respectively, with the axis 150. However, either one of cam surfaces 20a, 30b could form a 90 degree angle with the axis 150 without deviating from the scope of the present invention. It is nonetheless preferred that the cam surfaces 20a, 30b form acute angles to facilitate smooth operation of the force amplifier 70 with reduced roller 260 skidding and increased force amplification.

In one embodiment, the angles α, β are approximately equal to each other. According to various embodiments of the present invention, the angles α, β are greater than 45 degrees, greater than 50 degrees, less than 90 degrees, less than 85 degrees, less than 80 degrees, between 45 and 80 degrees, and/or about 60 degrees. According to various embodiments, the angle γ is smaller than the angles α, β, which increases the force amplification. According to various embodiments, the angle γ is less than 45 degrees, less than 30 degrees, less than 20 degrees and/or about 15 degrees. As used herein, all angles relative to the axis 150 are measured as the smallest angle between the relevant surface and the axis 150. For example, if an angle relative to the axis 150 is obtuse (e.g., 150 degrees) when measured in one direction but acute (e.g., 30 degrees) when measured in the opposite direction, the angle is considered to be the acute angle. Accordingly, no angle relative to the axis 150 is greater than 90 degrees.

Such non-zero, non-right angles tend to reduce friction and skidding of the rollers 260 relative to the surfaces 20a, 30b, 250a, which increases the forces transferred from the driver 60 to the draw bar 30. For example, when the structure 250 and draw bar 30 move toward their closed position (shown in FIG. 7), the rollers 260 roll counterclockwise (as shown in FIG. 7) down the surface 20a toward the draw bar 30 and roll up the surface 250a. Conversely, when the structure 250 and draw bar 30 move toward their open positions, the rollers 260 roll clockwise (as shown in FIG. 7) up the surface 20a toward the structure 250 and roll down the surface 250a.

In another embodiment, the cam surfaces 20a, 30b, 250a form an isosceles triangle having the cam surface 250a as its base (i.e., an angle between the cam surface 20a and the cam surface 250a is equal to an angle between the cam surface 30b and the cam surface 250a) such that the rollers 260 apply approximately equal normal forces to the cam surfaces 20a, 30b.

The ratio X:Y increases as the angle between the axis 150 and either of the cam surfaces 20a, 30b approaches 90 degrees. Similarly, the ratio X:Y increases as the angle between the axis 150 and the cam surface 250a approaches 0 degrees (i.e., the cam surface 250a is parallel to the axis 150).

While the illustrated force amplifier 70 relies on rollers 260 and angled cam surfaces 20a, 250a, 30b to amplify the driving force of the driver 60, any other suitable force amplifier may be utilized to amplify a force of the driver 60 without deviating from the scope of the present invention. For example, the driving force of the driver 60 may be converted into rotational force that acts through a gear transmission (and/or rack and pinion transmission) and is then converted back into an amplified linear closing force. Alternatively, the force amplifier may utilize a lever and fulcrum with lever arms that are sized to amplify a driving force of the driver 60.

The driver 60 moves the draw bar 30 toward the closed position and moves the collet 40 into the gripping position in the absence of a counteracting opening force. This results in a failsafe feature in that the workholding clamping assembly 10 will not accidentally release the work piece even if power (e.g., electric/hydraulic/pneumatic/mechanical) to the workholding clamping assembly 10 is shut off or lost. The failsafe feature improves concentricity and reduces scrap in the event of lost power.

The workholding clamping assembly 10 may be designed to enable an operator to adjust the gripping force of the workholding clamping assembly 10. For example, the gripping force may be adjusted by modifying the driver 60 (e.g., adding or reducing the number of springs in the driver 60; flipping the orientation of Belleville springs in the driver to operate in series (shown in FIGS. 1-4) or parallel). Alternatively, the gripping force may be adjusted by adjusting the compression of the driver 60 when the workholding clamping assembly 10 is in the closed position shown in FIGS. 3 and 4. A spacer ring (not shown) may be installed between the driver 60 and the base 20 or structure 250 to increase the compression of the driver 60 and increase the gripping force of the workholding clamping assembly 10. Alternatively, the base 20, itself, may include an adjustment feature. As shown in FIG. 3, the base 20 includes forward and rearward portions 20c, 20d that are bolted together via bolts 270. Spacers (not shown) may be placed between the base portions 20c, 20d to modify a relative axial distance between the forward portion 20c (including the cam surface 20a as shown in FIG. 1) and the spindle 50. Such an adjustment changes the compression of the driver 60 when the workholding clamping assembly 10 is closed (FIGS. 3, 4), while maintaining the spindle 50 in a fixed axial position relative to the rearward portion 20d so as not to affect the axial position of work pieces held in the workholding clamping assembly 10. Accordingly, the gripping force of the workholding clamping assembly 10 can be adjusted to predetermined gripping forces regardless of the amount of force (e.g., hydraulic/pneumatic pressure, mechanical draw bar force) that is applied to open the workholding clamping assembly 10.

Hereinafter, the collet opener 80 is described with reference to FIG. 2. In the illustrated embodiment, the collet opener 80 comprises a piston/cylinder 310, 300 that operatively extends between the base 20 and the structure 250. The annular cylinder 300 operatively connects to the base 20. In the illustrated embodiment, the cylinder 300 is integrally formed with the base 20, but may alternatively be separately formed and subsequently connected to the base 20. The piston 310 sealingly mates with the cylinder 300. The piston 310 operatively connects to the structure 250 for axial movement with the structure 250 relative to the base 20. In the illustrated embodiment, the piston 310 and structure 250 are integrally formed. However, any other suitable connection (e.g., bolts, screws, fasteners, welds, glue, compressive contact) may alternatively be used without deviating from the scope of the present invention.

In the illustrated embodiment, the cylinder 300 moves with the base 20 relative to the piston 310 and structure 250. However, the relative positions of the piston 310 and cylinder 300 may be reversed such that the piston 310 moves with the base 20 relative to the cylinder 300 and structure 250 without deviating from the scope of the present invention. A fluid port 320 fluidly connects to a volume between the piston 310 and cylinder 300. Selective application of pressurized fluid to the piston/cylinder 310, 300 urges the piston 310 to extend axially relative to the cylinder 300, thereby applying an opening force to the structure 250, which biases the structure 250 toward its open position (shown in FIGS. 1, 2) against the driving force of the driver 60. The piston/cylinder 310, 300 is sized and/or the fluid pressure is controlled so that the piston/cylinder 310, 300 generates an opening force that is larger than the driving force of the driver 60. Consequently, the piston/cylinder 310, 300 prevents the driver 60 from biasing the draw bar 30 toward its closed position (shown in FIGS. 1, 2), allows the draw bar 30 to move into its open position (shown in FIGS. 3, 4), and allows the collet 40 to move into its released position.

According to another embodiment of the present invention, the piston/cylinder 310, 300 is used to selectively limit the gripping force that the collet 40 applies to a work piece. A pressure regulator is operatively disposed between a pressurized air supply and the fluid port 320. The pressure regulator is then used to apply a controlled pressure to the piston/cylinder 310, 300 such that the piston/cylinder 310, 300 generates a reduced opening force that partially counteracts the driving force of the driver 60. The force differential between the driving force and the reduced opening force determines the force that is applied to the draw bar 30 and collet 40. The use of such reduced pressure in the piston/cylinder 310, 300 enables an operator to selectively reduce the gripping force of the assembly 10 on the fly without modifying or adjusting any structural component of the assembly 10 (e.g., without changing/modifying the driver 60 or changing the compression distance of the driver 60). In such an embodiment, if air pressure is lost or shut off, the gripping force will increase, but the fail safe aspect of the assembly 10 will prevent a work piece from coming out of the assembly 10.

According to an alternative embodiment of the present invention, a pneumatic piston/cylinder is formed around or beside the driver 60 to selectively increase the driving force applied to the force amplifier 70. Such a piston/cylinder would enable an operator to selectively and controllably (via a pressure regulator) increase the gripping force of the collet 40 beyond what the driver 60, itself, can generate. If the air pressure is lost or shut off, the gripping force will decrease, but the driver 60 will still generate a driving force to keep the work piece secured in the collet 40.

As discussed above, the force amplifier 70 reduces a driving force that the driver 60 must generate to close the collet 40, which, in turn, reduces the opening force that the collet opener 80 must apply to overcome the driving force. This reduction in the required driving and opening forces enables the driver 60 and collet opener 80 to be more compact than would be otherwise necessary in the absence of the force amplifier 70. Reducing the size of the driver 60 and/or collet opener 80 reduces the size of the workholding clamping assembly 10, which enables an operator to mount more workholding clamping assemblies 10 onto a given subplate for a work piece processing machine such as a turning, milling, grinding, and/or workholding machine. Alternatively, the workholding clamping assembly 10 may mount directly to a machine.

As shown in FIG. 6, a plurality of workholding clamping assemblies 10 may be mounted onto a common subframe (or pallet) 330 away from a machine that the work pieces are used in connection with. A pressurized air supply is attached to the fluid ports 320 of the assemblies 10 (sequentially or simultaneously) to move the collets 40, 340, 440 of the workholding clamping assemblies 10 into their released positions. A plurality of work pieces are inserted into or mounted onto the collets 40, 340, 440. The pressurized air supply is then detached from the workholding clamping assemblies 10. The subframe 330 and attached untethered workholding clamping assemblies 10 can then easily be attached to the machine while securely holding the work pieces. The failsafe feature of the assemblies 10 make it unnecessary to supply pressurized air to the machine. Instead, pressurized air need only be supplied to the location/station where work pieces are attached and detached from the assemblies 10.

A plurality of subframes 330 may be used in connection with a single machine such that the machine interacts with the work pieces mounted to one subframe 330 while an operator exchanges work pieces on additional subframe(s) 330 away from the machine. Machine down time can therefore be limited to the time required to detach one subframe 330 from the machine and attach another subframe 330 with new work pieces/blanks to the machine.

The illustrated piston/cylinder 310, 300 is a pneumatic piston/cylinder. However, the workholding clamping assembly 10 may alternatively utilize a hydraulic piston/cylinder without deviating from the scope of the present invention. A pneumatic piston/cylinder is nonetheless preferred because it simplifies connection/disconnection of the workholding clamping assembly 10 to/from a pressurized fluid source. The force amplifier 70 may enable a pneumatic piston/cylinder to be used in a high gripping-force workholding clamping assembly that would otherwise require more force than a reasonably sized pneumatic piston/cylinder can generate.

In one embodiment, the annular piston/cylinder 310, 300 has an inside diameter of 1.5 inches and an outside diameter of 4.125 inches, which creates a net area of 11.6 inches. Pneumatic pressure of about 70 psi therefore generates about 810 pounds of opening force. Accordingly, standard shop compressed air systems that generate 75 psi can be used in connection with the assembly 10. The driver 60 is sized to provide a driving force of about 470 pounds when the workholding clamping assembly 10 is closed (as shown in FIGS. 3, 4) and about 714 pounds when the workholding clamping assembly 10 is open (shown in FIGS. 1, 2). Accordingly, the opening force of the piston/cylinder 310, 300 is larger than the driving force. However, as discussed below, the driving force and opening force when the workholding clamping assembly 10 is in the open position are preferably relatively similar so as to reduce rotational friction between the draw bar 30 and the structure 250 when the workholding clamping assembly 10 is in the open position.

In one embodiment, the force amplifier 70 has a 3.74:1 transmission ratio such that the workholding clamping assembly 10 converts the 470 pound driving force of the driver 60 into a 1758 pound amplified axial closing force that is applied to the collet 40. In one embodiment, the cam surfaces 40c, 50b form about a 10 degree angle with the axis 150. When friction and other forces are taken into account, the 1758 pound axial closing force becomes a 4671 pound radial gripping force in the collet 40.

In the illustrated embodiment, the collet opener 80 comprises a piston/cylinder 310, 300. However, any other suitable collet opener that can selectively apply an opening force to the structure 250 (or directly to the draw bar 30) may alternatively be used without deviating from the scope of the present invention. For example, a mechanical lever or gear mechanism may be used to displace the structure 250. Alternatively, to open the workholding clamping assembly 10, the workholding clamping assembly 10 may be mounted to a device that includes a draw bar that can selectively displace the structure 250 (or the draw bar 30) into its open position. The collet opener 80 may be incorporated into the workholding clamping assembly 10, or may be a discrete device that attaches to the workholding clamping assembly 10 when an operator chooses to open the collet 40.

The spindle 50 and collet 40 include mating surface features that permit the collet 40 to be inserted axially into the bore 50a in the spindle 50, and prevent the collet 40 from rotating relative to the spindle 50 about the axis 150. In the illustrated embodiment, the surface features comprise a collet key 170 extending inwardly from the spindle 50 into the bore 50a and an axially extending groove 40d on an outer radial surface of the collet 40. The relative positions of the collet key 170 and groove 40d may be reversed without deviating from the scope of the present invention. The mating surface features ensure that the collet 40 maintains a predetermined rotational orientation about the axis 150 relative to the spindle 50 and base 20. Controlling the orientation of the collet 40 may be advantageous when non-circular work pieces are to be held by the workholding clamping assembly 10 and used in a manner that is rotationally asymmetric.

Hereinafter, the draw bar rotating mechanism 90 is described with reference to FIGS. 1 and 2. Because the surface features 170, 40d prevent the collet 40 from rotating relative to the spindle 50 and base 20, the draw bar 30 is rotated to threadingly engage the draw bar's threaded portion 30a and the collet's threaded portion 40a. In the illustrated embodiment, the draw bar 30 is disposed within the base 20, and is not easily directly accessible so as to enable an operator to rotate the draw bar 30 to secure it to the collet 40. Accordingly, the draw bar rotating mechanism 90 facilitates rotation of the draw bar 30.

As shown in FIGS. 1 and 2, a driven gear 200 concentrically mounts to the draw bar 30 for rotation with the draw bar 30 relative to the base 20. The driven gear 200 mounts to the draw bar 30 using any suitable mounting mechanism (e.g., pinned connection, integral formation, etc.). A driving gear 210 mounts to the base 20 for rotation relative to the base 20. The driving gear 210 meshes with the driven gear 200. A bolt 220 operatively connects to the driving gear 210 for rotation with the driving gear 210 relative to the base 20. A head of the bolt 220 is accessible from outside of the base 20 to enable an operator to selectively rotate the bolt 220, which, in turn rotates the driving gear 210, the driven gear 200, and the draw bar 30.

To attach the collet 40 to the workholding clamping assembly 10, the operator first operates the collet opener 80 to open the workholding clamping assembly 10. The driving force of the driver 60 and the closing force of the collet opener 80 are preferably set so as to minimize the force applied to the draw bar 30 by the structure 250 when the workholding clamping assembly 10 is in the open position. This reduces the rotational friction between the draw bar 30 and the structure 250 to facilitate rotation of the draw bar 30. The operator inserts the collet 40 into the bore 50a such that the groove 40d aligns with the collet key 170 and the threads of the threaded portions 30a, 40a abut each other. The operator then rotates the bolt 220 (either by hand or by using an appropriate tool that mates with the head of the bolt 220) to rotate the draw bar 30 and engage the threaded portions 30a, 40a.

In the illustrated embodiment, the bolt 220 is accessible from a forward, axial end (upper end as shown in FIG. 1) of the assembly 10. However, the draw bar rotating mechanism 90 could be designed to enable access to the bolt 220 from a radial side of the assembly 10. For example, the driving and driven gears 210, 200 could comprise bevel gears such that an axis of the bolt 220 extends radially outwardly from the assembly 10.

According to an alternative embodiment of the present invention, the draw bar rotating mechanism 90 is omitted. Instead, the draw bar 30 is rotationally fixed relative to the base 20. Four circumferentially-spaced movable collet keys similar to the collet key 170 extend into the bore 50a in the spindle. The collet keys are radially spring loaded such that springs that operatively extend between the spindle 50 and each key bias the keys toward an operative position shown in FIG. 1. A radially-outward portion of each key includes a grip that enables an operator to pull the key out of the bore 50a. To mount the collet 40 to the assembly 10, an operator uses the grip to pull the keys radially out of the bore 50a. The operator then inserts the collet 40 into the bore and rotates the collet 40 to threadingly engage the draw bar 30. The operator then releases the grips to allow the keys to move into the bore 50a. The operator aligns the key that is rotationally closest to the groove 40d with the groove 40d so that the key extends into the groove 40d and rotationally secures the collet 40 to the assembly 10. The use of four keys enables the operator to thread the collet 40 into the draw bar 30 to a desired axial position and then rotate the collet 40 by no more than ⅛ of a turn to align it with the closest key. Greater or fewer keys may be provided depending on how significant the axial position of the collet 40 is. A single key could be used without deviating from the scope of the present invention. The collet 40 may include a curved axial end that pushes the keys out of the bore 50a when the collet 40 is inserted into the bore 50a. The groove 40d may be very short axially such that the groove 40d does not axially align with any of the keys until the collet 40 is securely threaded to the draw bar 30.

According to an alternative embodiment of the present invention, the draw bar rotating mechanism 90 is omitted. Instead, a bayonet-type quick-change collet may be selectively locked onto a bayonet-receiving draw bar by pushing the collet into a draw bar and rotating the collet to lock it in place. A spring may be provided on the draw bar to bias the collet into its locked position. If the collet key 170 is used to prevent the collet from rotating, the draw bar mechanism 90 may be incorporated into this embodiment to enable the draw bar to rotate through a small arc (e.g., 30 degrees) to lock the bayonet-style collet in place. In such an embodiment, the bayonet-style locking mechanism would replace the threaded locking mechanism used to secure the collet 40 to the draw bar 30. The bayonet-style locking mechanism may operate like the Hydromat collet.

Typically, when the draw bar 30 is in its closed position, and the collet opener 80 overcomes the driving force of the driver 60, the resilient spring bias of the collet segments 40b and the resulting cam interaction between the surfaces 40c, 50b of the collet 40 and spindle 50 cause the collet 40 to move into its released position, which causes the draw bar 30 to move into its open position (as shown in FIGS. 1, 2). However, in some instances, the collet 40 may bind against the spindle 50 so that the collet 40 does not naturally move into its released position when the collet opener 80 counteracts the closing force of the driver 60. Accordingly, the structure 250 preferably includes a feature that ensures that moving the structure 250 into its open position under the force of the collet opener 80 causes the draw bar 30 to move into its open position and causes the collet 40 to move into its release position. As shown in FIG. 3, the structure 250 includes an axially facing surface 250b that faces an opposing surface 30c. The axially facing surfaces 250b, 30c are preferably orthogonal to the axis 150, but may alternatively form acute angles with the axis 150 such that the axially facing surfaces 250b, 30c include components that are orthogonal with the axis 150. As shown in FIGS. 3 and 4, the surfaces 250b, 30c are spaced from each other when the draw bar 30 and structure 250 are in their closed positions. As shown in FIGS. 1 and 2, the surfaces 250b, 30c contact each other (or are spaced from each other by a small axial distance) when the draw bar 30 and structure 250 are in their open positions. Consequently, if the collet 40 does not naturally move into its released position when the collet opener 80 pushes the structure 250 into its open position, the surface 250b of the structure 250 taps against the surface 30c of the draw bar 30 and forces the draw bar 30 into its open position, thereby forcing the collet 40 into its released position. The workholding clamping assembly 10 is preferably designed so that the structure 250 will not tap against the draw bar 30 until the structure is close to its open position. Such timing reduces the chance that the contact between the structure 250 and drab bar 30 will cause these components and the rollers 260 to bind.

As shown in FIG. 1, the base 20 includes a through bore 20b that is concentric with the axis 150. The bore 20b preferably has a large diameter. The work piece ejector 100 is disposed in the bore 20b and is accessible from a tail end of the workholding clamping assembly 10 (the lower end as shown in FIGS. 1-4). The ejector 100 facilitates easy and/or automated removal of work pieces from the workholding clamping assembly 10 when the collet 40 releases the work piece. The large bore 20b may also help in the removal of cutting fluids and chips that accumulate during machining processes.

The assembly 10 may be mounted horizontally to a machine such that the axis 150 extends generally horizontally. Work piece(s) may be continuously fed through the bore 20b from a rear of the assembly 10 and ejected out of a front of the assembly 10 to facilitate continuous machining.

Figure 5:
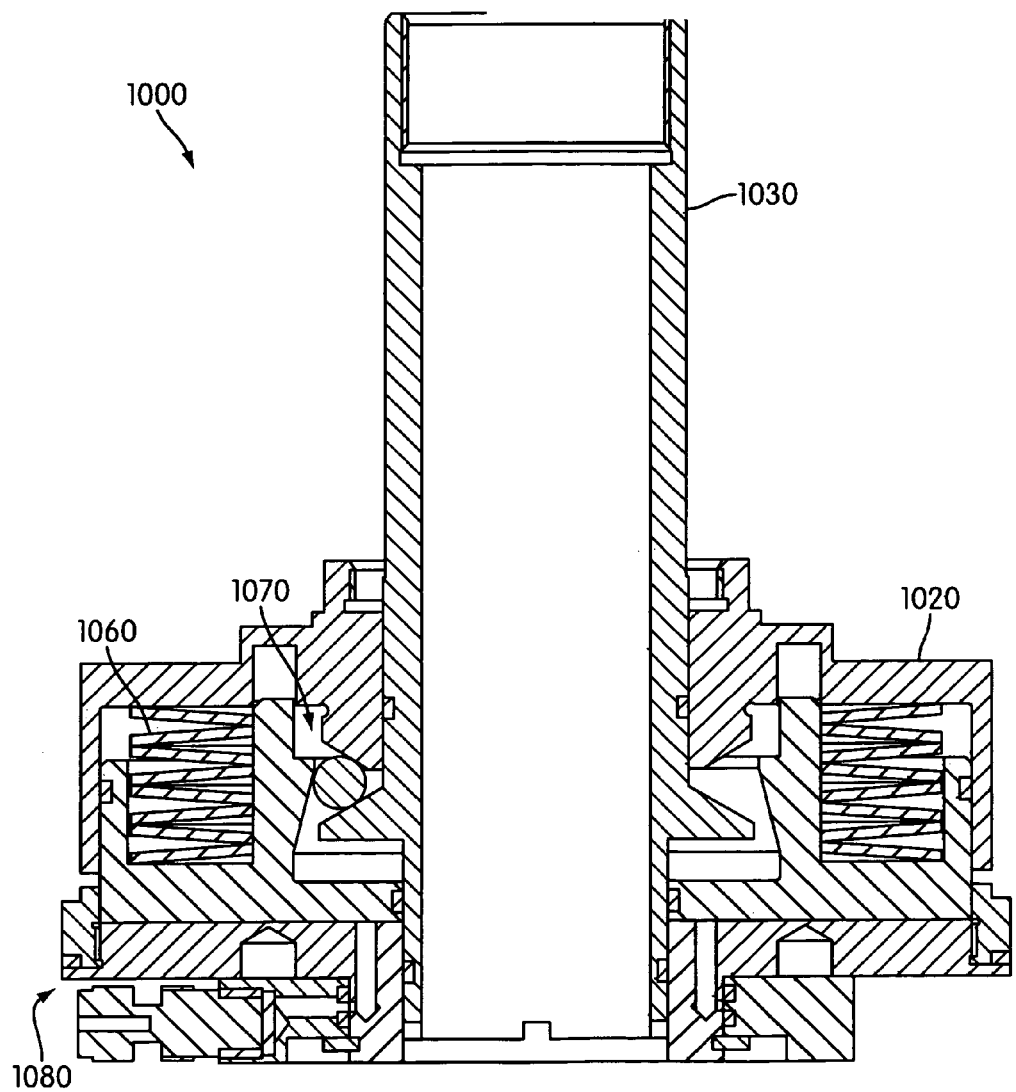
FIG. 5 is a cross sectional view of a workholding clamping assembly according to an alternative embodiment of the present invention.

FIG. 5 illustrates a workholding clamping assembly 1000 according to an alternative embodiment of the present invention. As in the workholding clamping assembly 10, the workholding clamping assembly 1000 comprises a base 1020, a draw bar 1030, a collet and spindle (not shown), a driver 1060, a force amplifier 1070, and a collet opener 1080. The workholding clamping assembly 1000 does not include a draw bar rotating mechanism 90. The workholding clamping assembly 1000 may be used in such commercial devices as Hardinge Inc.'s 5C Indexing System.

According to an alternative embodiment of the present invention, the spindle 50 and collet 40 are omitted from the assembly 10. The base 20 operatively mounts to a frame having a plurality of collet closers disposed thereon. A plurality of collets extend into the collet closers. The collets each mount to a draw plate that moves with the collets relative to the frame. The draw plate operatively connects to the draw bar 30 such that axial movement of the draw bar 30 moves the draw plate to synchronously open or close all of the collets attached to the draw plate. Accordingly, a single assembly 10 can operate a plurality of collets. According to another embodiment of the present invention, additional assemblies 10 (without the spindle 50 or collet 40) operatively mount to the draw plate and frame to increase a closing force that the draw plate applies to the collets. The assemblies 10 may be attached to a common pressurized air supply so that the assemblies 10 operate in unison to open and close the collets.

The foregoing description is included to illustrate the operation of the preferred embodiments and is not meant to limit the scope of the invention. To the contrary, those skilled in the art should appreciate that varieties may be constructed and employed without departing from the scope of the invention, aspects of which are recited by the claims appended hereto.

What is claimed is:

1. A combination comprising:
a pallet configured to have a plurality of workholding assemblies attached thereto, the pallet being configured to be mounted to a base machine; and
a failsafe workholding clamping assembly mounted to the pallet, the failsafe workholding clamping assembly comprising:
a base;
a draw bar operatively connected to the base for movement along an axis relative to the base between open and closed positions;
a structure operatively connected to the base for movement along the axis relative to the base between open and closed positions;
a driver that operatively extends between the base and the structure and applies a continuous driving force to the structure that tends to bias the structure toward its closed position;
a force amplifier operatively extending between the structure and the draw bar, the force amplifier amplifying the driving force and applying a resulting amplified force to the draw bar to bias the draw bar toward its closed position; and
a collet opener supported by the base and constructed and arranged to apply a force to the structure that counteracts the driving force with an opening force, thereby preventing the driver from biasing the draw bar toward the closed position.

2. The combination of claim 1, wherein the structure and the draw bar are positioned and arranged such that if the draw bar does not move into its open position when the structure moves into its open position, the structure contacts the draw bar and forces the draw bar into its open position.

3. The combination of claim 1, wherein the driver comprises a plurality of disc springs.

4. The combination of claim 1, wherein the force amplifier comprises:
a first surface that moves with the draw bar relative to the base along the axis;
a second surface that moves with the base relative to the draw bar;
a third surface that moves with the structure and forms a non-zero angle with the axis; and
at least one circular roller disposed between and contacting the first, second, and third surfaces.

5. The combination of claim 4, wherein:
the first, second, and third surfaces each comprise frusta-conical surfaces; and
the at least one circular roller comprises a plurality of spherical rollers.

6. The combination of claim 4, wherein:
the first, second, and third surfaces are angled relative to each other such that movement of the structure by an axial distance X toward its closed position causes the draw bar to move an axial distance Y toward its closed position, and
a ratio X:Y is greater than 1.

7. The of claim 6, wherein the ratio X:Y is greater than 2.

8. The combination of claim 4, wherein:
the draw bar includes a fourth surface having an axially facing component,
the structure includes a fifth surface having an axially facing component that faces the fourth surface, and
movement of the structure into its open position causes the fourth and fifth surfaces to contact each other.

9. The combination of claim 1, wherein:
the collet opener comprises a piston/cylinder operatively extending between the base and the structure, and the selective application of pressurized fluid to the piston/cylinder creates the opening force.

10. The combination of claim 9, wherein the piston/cylinder comprises a pneumatic piston/cylinder.

11. The combination of claim 1, wherein the base includes a bore that is concentric with the axis and extends through the entire workholding clamping assembly.

12. The combination of claim 1, wherein:
the base includes a spindle having a bore therein that is concentric with the axis,
the workholding clamping assembly further comprises a collet disposed in the bore, the collet having gripping and released positions,
the collet and spindle include mating surfaces that form a non-zero angle with the axis,
the collet has a threaded portion that threadingly engages a threaded portion of the draw bar, and
axial movement of the draw bar toward its closed position moves the collet toward its gripping position.

13. The combination of claim 12, wherein the bore extends through the entire workholding clamping assembly, and wherein the workholding clamping assembly further comprises a work piece ejector disposed at least partially in the bore.

14. A failsafe workholding clamping assembly comprising: a base; a draw bar operatively connected to the base for movement along an axis relative to the base between open and closed positions; a structure operatively connected to the base for movement along the axis relative to the base between open and closed positions; a driver that operatively extends between the base and the structure and applies a continuous driving force to the structure that tends to bias the structure toward its closed position; a force amplifier operatively extending between the structure and the draw bar, the force :amplifier amplifying the driving force and applying a resulting amplified force to the draw bar to bias the draw bar toward its closed position, the force amplifier comprising a first surface that moves with the draw bar relative to the base along the axis, the first surface forming an acute angle B with the axis, a second surface that moves with the base relative to the draw bar, the second surface forming an acute angle (z with the axis, a third surface that moves with the structure and forms an acute, non-zero angle with the axis, and at least one circular roller disposed between and contacting the first, second, and third surfaces; and a collet opener supported by the base and constructed and arranged to apply a force to the structure that counteracts the driving force with an opening force, thereby preventing the driver from biasing the draw bar toward the closed position, wherein when the structure is in the open position an axial space utilized by the driver overlaps an axial space utilized by the third surface.

15. The workholding clamping assembly of claim 14, wherein the structure and draw bar are arranged such that the structure cannot move into its open position unless the draw bar is disposed in its open position.

16. The workholding clamping assembly of claim 14, wherein the angles $\alpha$ and $\beta$ are each less than 85 degrees.

17. The workholding clamping assembly of claim 14, wherein the angles $\alpha$ and $\beta$ are about equal to each other.

18. The workholding clamping assembly of claim 14, wherein:

the first, second, and third surfaces each comprise frustaconical surfaces; and the at least one circular roller comprises a plurality of spherical rollers.

19. The workholding clamping assembly of claim 14, wherein:

the first, second, and third surfaces are angled relative to each other such that movement of the structure by an axial distance X toward its closed position causes the draw bar to move an axial distance Y toward its closed position, and a ratio X:Y is greater than 1.

20. The workholding clamping assembly of claim 14, wherein:

the collet opener comprises a piston/cylinder operatively extending between the base and the structure, and the selective application of pressurized fluid to the piston/cylinder creates the opening force.

21. The assembly of claim 14, wherein the axial space utilized by the driver overlaps an axial space occupied by the at least one circular roller.

22. The workholding clamping assembly of claim 14, wherein:

the collet opener comprises a piston and cylinder operatively extending between the base and the structure;

the selective application of pressurized fluid to the cylinder creates the opening force; and one of the piston or cylinder and the third surface are rigidly connected to each other or formed by a unitary piece of material.

23. A workholding clamping assembly comprising:

a base including a spindle;

a draw bar operatively connected to the base for movement along an axis relative to the base between open and closed positions, the draw bar being rotatable relative to the base and spindle about the axis, the draw bar including a threaded portion that is constructed and arranged to threadingly engage a collet via rotation of the draw bar relative to the spindle, base, and collet;

a driven gear operatively connected to the draw bar for rotation with the draw bar relative to the base and spindle; and a driving gear mounted to the base for rotation relative to the base, the driving gear meshing with the driven gear, the driving gear being selectively rotatable.

24. The workholding clamping assembly of claim 23, wherein:

the spindle has a bore therein that is concentric with the axis, the workholding clamping assembly further comprises a collet disposed in the bore, the collet having gripping and released positions, the collet and spindle include mating surfaces that form a non-zero angle with the axis, the collet has a threaded portion that threadingly engages the threaded portion of the draw bar, axial movement of the draw bar toward its closed position moves the collet toward its gripping position, and the collet and spindle include mating surface features that permit the collet to extend into the bore in the spindle in a predetermined rotational position, and the mating surface features preventing the collet from rotating relative to the spindle.

25. The workholding clamping assembly of claim 24, wherein:

the surface feature of the spindle comprises a collet key that extends radially into the bore, and the surface feature of the collet comprises an axially extending groove in the collet.

26. The workholding clamping assembly of claim 24, further comprising:

a driver that applies a continuous driving force to the draw bar to bias the draw bar toward the closed position; and a collet opener supported by the base and constructed and arranged to selectively counteract the driving force with an opening force, thereby preventing the driver from biasing the draw bar toward the closed position, wherein the driver moves the draw bar into the closed position in the absence of the opening force.

27. The workholding clamping assembly of claim 26, further comprising a force amplifier supported by the base, the force amplifier amplifying the driving force and applying a resulting amplified force to the draw bar to bias collet toward its gripping position.

28. The workholding clamping assembly of claim 23, wherein the spindle is constructed and arranged to mate with a collet while preventing the collet from rotating relative to the spindle about the axis.

29. The workholding clamping assembly of claim 23 in combination with a pallet configured to have a plurality of workholding clamping assemblies according to claim 23 attached thereto, the pallet being configured to be mounted to a base machine, the workholding clamping assembly of claim 22 being mounted to the pallet.

30. A failsafe workholding clamping assembly comprising:

a base including a spindle having a bore therein that is concentric with an axis;

a draw bar operatively connected to the base for movement along the axis relative to the base between open and closed positions, the draw bar having a threaded portion;

a collet disposed in the bore, the collet and spindle including mating cam surfaces that form a non-zero angle with the axis, the collet having a threaded portion that is threadingly engaged with the threaded portion of the draw bar such that axial movement of the draw bar toward its closed position moves the collet toward its gripping position;

a structure operatively connected to the base for movement along the axis relative to the base between open and closed positions;

a driver that operatively extends between the base and the structure and applies a continuous driving force to the structure that tends to bias the structure toward its closed position;

a force amplifier operatively extending between the structure and the draw bar, the force amplifier amplifying the driving force and applying a resulting amplified force to the draw bar to bias the draw bar toward its closed position, the force amplifier being formed in part by a surface of the draw bar; and a collet opener supported by the base and constructed and arranged to apply a force to the structure that counteracts the driving force with an opening force, thereby preventing the driver from biasing the draw bar toward the closed position, wherein the surface of the draw bar and the threaded portion of the draw bar are formed by a unitary piece of material.

* * * * *